United States Patent
Twede

(10) Patent No.: US 7,408,658 B2
(45) Date of Patent: Aug. 5, 2008

(54) GENERATION AND USAGE OF WORKFLOWS FOR PROCESSING DATA ON A PRINTING DEVICE

(75) Inventor: Roger S. Twede, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 10/000,527

(22) Filed: Dec. 4, 2001

(65) Prior Publication Data

US 2003/0103232 A1      Jun. 5, 2003

(51) Int. Cl.
*B41J 1/00* (2006.01)
*G06F 15/00* (2006.01)

(52) U.S. Cl. .................. 358/1.15; 358/1.1; 399/81; 715/700; 715/735; 715/744; 715/765; 715/866

(58) Field of Classification Search ............. 358/1.15, 358/1.14, 524, 453, 1.1, 1.6, 1.13; 345/173, 345/594, 650, 736; 399/81; 715/700, 717, 715/735, 737, 740, 744, 747, 764–766, 769, 715/770, 810, 835, 840, 866
See application file for complete search history.

(56) References Cited

U.S. PATENT DOCUMENTS

| | | | |
|---|---|---|---|
| 4,970,554 A | 11/1990 | Rourke | |
| 5,119,206 A | 6/1992 | Rourke et al. | |
| 5,604,860 A * | 2/1997 | McLaughlin et al. | 715/866 |
| 5,717,439 A * | 2/1998 | Levine et al. | 715/835 |
| 5,771,339 A | 6/1998 | Fromherz et al. | 395/112 |
| 5,781,710 A | 7/1998 | Fromherz et al. | 395/114 |
| 5,923,013 A | 7/1999 | Suzuki et al. | 235/375 |
| 6,146,037 A | 11/2000 | Schuh et al. | 400/703 |
| 6,256,104 B1 | 7/2001 | Rumph et al. | 358/1.15 |
| 6,380,951 B1 * | 4/2002 | Petchenkine et al. | 715/736 |
| 6,522,421 B2 * | 2/2003 | Chapman et al. | 358/1.15 |
| 6,637,022 B1 * | 10/2003 | Weeren et al. | 717/109 |
| 6,965,450 B2 * | 11/2005 | Sweetland et al. | 358/1.18 |

(Continued)

FOREIGN PATENT DOCUMENTS

DE                69515374           8/2000

(Continued)

OTHER PUBLICATIONS

Search Report for United Kingdom Patent Application No. GB0502093.8. Search completed Mar. 23, 2005.

(Continued)

*Primary Examiner*—Kimberly A Williams

(57) ABSTRACT

The generation and usage of workflows for processing data on a printing device includes receiving a request to create a workflow for a printing device. One or more operations that may be included in the workflow are displayed, and user-selection of at least one of the one or more operations is received. The user-selected operations are added to the workflow, and a user-selection of an order in which multiple ones of the user-selected operations are to be performed is received. When the creation of the workflow is completed, an indication of such is received and the workflow is saved. According to another aspect, a request to process data is received, the appropriate workflow identified, and the data processed by performing the operations in the sequence in an order identified by the sequence.

23 Claims, 10 Drawing Sheets

U.S. PATENT DOCUMENTS

| | | | |
|---|---|---|---|
| 7,263,661 B2 * | 8/2007 | Chavers et al. | 715/744 |
| 7,275,213 B2 * | 9/2007 | Katano | 715/744 |
| 2001/0013947 A1 | 8/2001 | Van Der Linden et al. | |
| 2002/0112037 A1 * | 8/2002 | Koss | 709/220 |
| 2002/0131065 A1 * | 9/2002 | Sweetland et al. | 358/1.13 |
| 2003/0098891 A1 * | 5/2003 | Molander | 345/841 |
| 2004/0212823 A1 * | 10/2004 | Chavers et al. | 358/1.15 |
| 2005/0039125 A1 * | 2/2005 | Katano | 715/700 |
| 2005/0177799 A1 * | 8/2005 | Knight et al. | 715/810 |
| 2005/0193340 A1 * | 9/2005 | Amburgey et al. | 715/810 |
| 2005/0243365 A1 * | 11/2005 | Noda | 358/1.15 |
| 2005/0270566 A1 * | 12/2005 | Tanaka | 358/1.15 |
| 2005/0289470 A1 * | 12/2005 | Pabla et al. | 715/747 |
| 2006/0044612 A1 * | 3/2006 | Kayama | 358/1.15 |
| 2006/0221372 A1 * | 10/2006 | Onishi et al. | 358/1.13 |
| 2007/0038946 A1 * | 2/2007 | Grieshaber et al. | 358/1.1 |
| 2007/0157118 A1 * | 7/2007 | Wuttke | 715/810 |
| 2008/0016450 A1 * | 1/2008 | Aono | 715/747 |

FOREIGN PATENT DOCUMENTS

| | | | |
|---|---|---|---|
| EP | 331329 A1 * | 9/1989 | |
| EP | 0482311 | | 4/1992 |
| EP | 482311 A1 * | 4/1992 | |
| EP | 0806721 A1 | | 11/1997 |
| EP | 0977119 | | 2/2000 |
| EP | 1081637 | | 3/2001 |
| JP | 2000293467 | | 10/2000 |
| JP | 2000293467 A | | 10/2000 |
| WO | WO98/19478 | | 5/1998 |

OTHER PUBLICATIONS

JDF Specification Release 1.0, International Cooperation for Integration of Processes in Prepress, Press and Postpress, 463 pp. 2000-2001.

JDF Specification Draft Spiral 2.21, Adobe Systems, Inc., AGFA-Gevaert N.V., Heidelberg Druckmaschinen AG, MAN Roland Druckmaschinen AG, 268 pp. 2000.

Stefan Daun, Georg Lucas and Jurgen Schonhut, Specification of the CIP3 Print Production Format, Version 3.0,International Cooperation for Integration of Prepress, Press, and Postpress, 129 pp., Jun. 2, 1998.

* cited by examiner

340

GENERATION AND USAGE OF WORKFLOWS FOR PROCESSING DATA ON A PRINTING DEVICE

TECHNICAL FIELD

This invention relates generally to printing devices, and more particularly to the generation and usage of workflows for processing data on a printing device.

BACKGROUND

Printers have become increasingly commonplace in homes, businesses, and elsewhere throughout the world. Conventional printers allow users to generate paper copies of documents (e.g., supplied to the printer by a computer), and some also allow users to make copies of already generated paper documents.

Currently, in order for a computer to print documents on a printer, the computer is typically required to have a printer-specific set of instructions that define how the computer is to communicate with the printer. The set of printer-specific instructions for a particular printer is commonly referred to as a "driver" for that printer. The driver for a printer also typically allows the user of the computer to set a wide variety of printer parameters (e.g., print quality, number of pages to print, etc.). However, the use of such drivers is problematic because the computer is usually required to have such a driver for each printer at which it desires to print documents. This requires the user to install multiple drivers (one per printer), which can be burdensome to the user. For example, a person taking his or her portable computer out of his or her office for a meeting at another location and desiring to print documents on a printer at that location is required to have the proper driver(s) for that printer installed on his or her portable computer in order to print to that printer. This results in a user-unfriendly situation as the user must find some way to obtain the necessary drivers in order to print documents at that location.

The generation and usage of workflows for processing data on a printing device described herein helps solves these problems.

SUMMARY

Generation and usage of workflows for processing data on a printing device is described herein.

According to one aspect, a request to create a workflow for a printing device is received. One or more operations that may be included in the workflow are displayed, and user-selection of at least one of the one or more operations is received. The user-selected operations are added to the workflow, and a user-selection of an order in which multiple ones of the user-selected operations are to be performed is received. When the creation of the workflow is completed, an indication of such is received and the workflow is saved.

According to another aspect, a request to process data is received at a printing device and a stored set of one or more sequences of operations is accessed. Based at least in part on the request, which sequence from the stored set to use in processing the data is determined, and the data is processed by performing the operations in the sequence in an order identified by the sequence.

DETAILED DESCRIPTION

Figure 1:
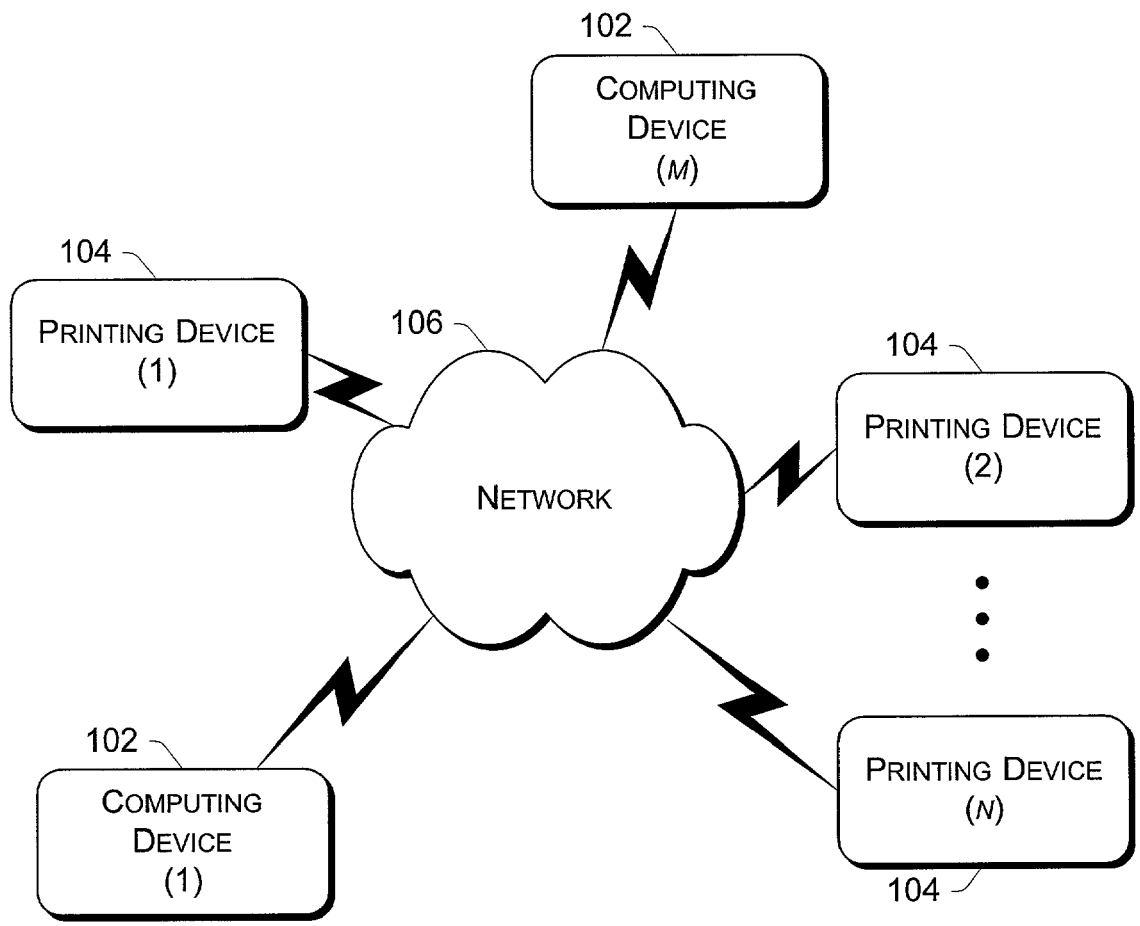
FIG. 1 illustrates an exemplary environment in which the generation and usage of workflows can be employed.

FIG. 1 illustrates an exemplary environment 100 in which the generation and usage of workflows can be employed. In environment 100, multiple (m) computing devices 102 are coupled to multiple (n) printing devices 104 via a network 106. Network 106 is intended to represent any of a wide variety of conventional network topologies and types (including wired and/or wireless networks), employing any of a wide variety of conventional network protocols (including public and/or proprietary protocols).

Computing devices 102 can be any of a wide variety of conventional computing devices, including desktop PCs, workstations, server computers, Internet appliances, gaming consoles, handheld PCs, cellular telephones, personal digital assistants (PDAs), etc. Computing devices 102 can be the same types of devices, or alternatively different types of devices.

Printing devices 104 can be any of a wide variety of conventional devices capable of generating a hard copy of data (e.g., received from one of computing devices 102). Examples of printing devices include printers, facsimile machines, multi-function machines (e.g., capable of performing multiple functions, such as the functions of both a printer and a facsimile machine). Printing devices 104 can generate hard copies of data in any of a variety of manners, such as by using toner (e.g., in laser printers), ink (e.g., in inkjet printers, bubblejet printers, dot matrix printers, etc.), heat applied to heat-sensitive print media (e.g., thermal printers), and so forth. Printing devices 104 can be the same types of devices, or alternatively different types of devices.

Workflows are generated for one or more of printing devices 104. A workflow can be generated by a user at the printing device 104 (e.g., via a display panel of the printing device 104) or alternatively by a user via a computing device 102. A workflow is a sequence of one or more operations to be performed by the printing device 104 when processing subsequently received requests. Different workflows can be generated by a user(s). These different workflows can include different operations (e.g., one may include print and email while another includes scan and print), different orders of operations (e.g., one may indicate to print first and then email, while another indicates to email first and then print), and/or different properties for operations (e.g., one may indicate to print two copies, while another indicates to print five copies).

A printing device 104 receives a request from one of computing devices 102 that identifies data to be processed as well as a particular workflow to be used in processing the data. Upon receipt of such a request, the printing device 104 uses the identified workflow to determine which operation(s) to perform on the data as well as what order to perform the operation(s) in, and processes the data accordingly. The request and data to be processed may originate from the printing device 104 itself (from a local in-device data store), or may be pull-based (e.g., a Uniform Resource Locator (URL) is entered on the printer's interface which references the web page or web content to fetch and use as input to the workflow sequence).

Figure 2:
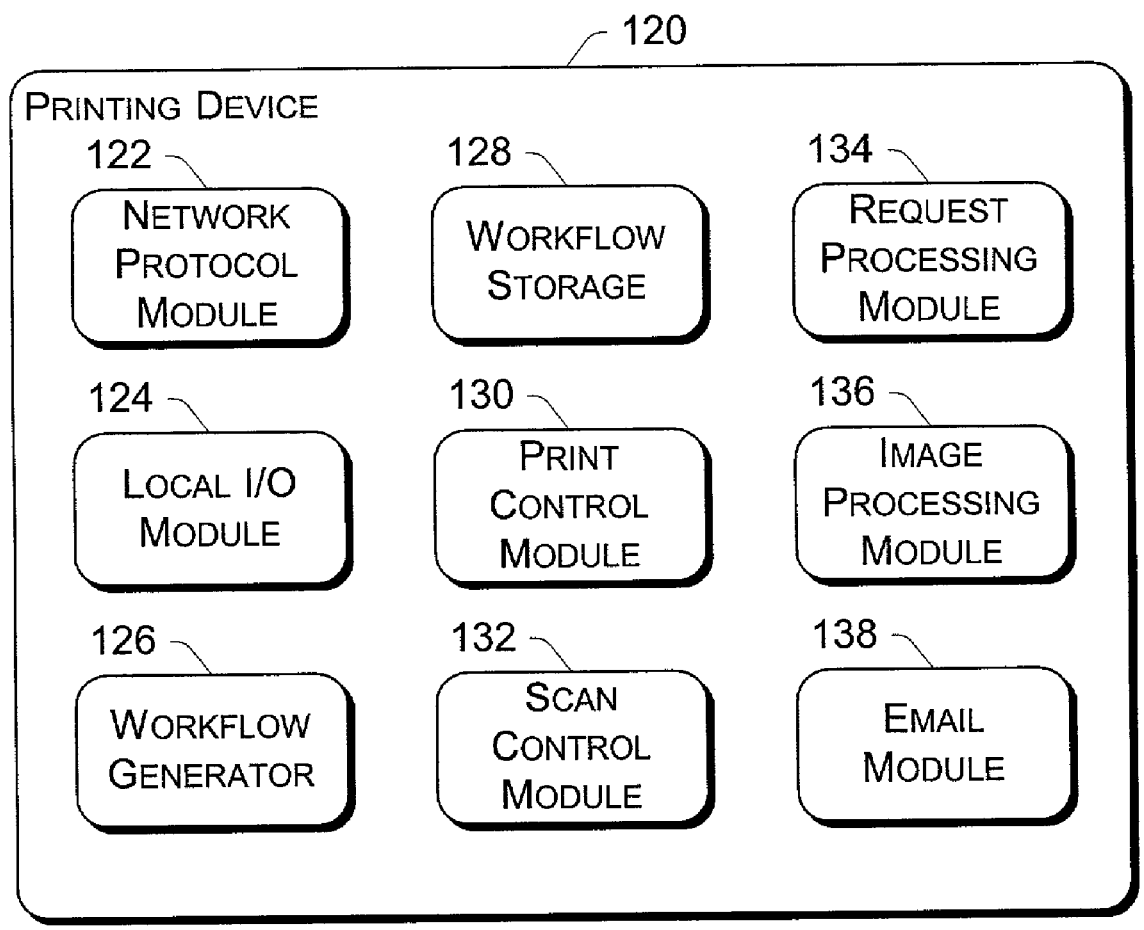
FIG. 2 is a block diagram illustrating an exemplary printing device in additional detail.

FIG. 2 is a block diagram illustrating an exemplary printing device 120 in additional detail. Printing device 120 can be any of printing devices 104 of FIG. 1. Printing device 120 includes several components: network protocol module 122, local input/output (I/O) module 124, workflow generator 126, workflow storage area 128, print control module 130, scan control module 132, request processing module 134, image processing module 136, and electronic mail (email) module 138. The components in FIG. 2 are exemplary only; the exact components included in any particular computing device can vary based on the type of device. By way of example, a printing device that did not have any scanning capability would typically not include a scan control module 130.

Network protocol module 122 manages communication between device 120 and one or more remote devices (e.g., via network 106 of FIG. 1). In the illustrated example, network protocol module 122 includes a software component(s) that implements one or more commonly available network protocols, such as the well-known HyperText Transport Protocol (HTTP). By using commonly available network protocols, a wide variety of remote devices can communicate with printing device 120 without requiring the installation on those remote devices of a driver specific to device 120. For example, most computing devices have a browser that communicates with other devices via HTTP. This browser can be used to access device 120 via module 122 based on the name (or network address) of device 120.

Local I/O module 124 controls the local input of commands and/or data to printing device 120. In one implementation, printing device 120 includes a display via which prompts and information can be displayed to a local user of device 120 (e.g., a user standing at device 120 rather than accessing device 120 via a network), and an input mechanism (e.g., touchscreen, keypad, etc.) via which the local user can input commands and/or data to device 120. Local I/O module 124 manages the displaying of such information or prompts, as well as the receipt of input commands and/or data and the routing of such inputs to the appropriate components of device 120.

Workflow generator 126 allows a user of device 120 to generate workflows for device 120. Workflows can be generated locally at device 120, in which case workflow generator 126 operating at device 120 manages such generation. Workflows may also be generated remotely from device 120, in which case workflow generator 126 communicates with the remote device to allow the workflows to be generated (generator 126 may copy a series of instructions to the remote device for execution on the device and return of data describing the workflow to printing device 120, or alternatively generator 126 may simply communicate information to be displayed at the remote device and the user selections in response to that information returned to generator 126).

Workflows generated by generator 126 may be public or private in nature. For example, multiple users of a printing device may define their own workflows that are accessible only to themselves (e.g., each user may need to input a user id and/or password in order to access the workflows he or she has defined). Additionally, one or more workflows may be designated as public workflows which any user of the printing device may use regardless of which user generated them.

Workflow storage area 128 is a storage area for workflows to be used by printing device 120. The workflows in storage area 128 include those workflows generated by generator 126. Storage area 128 may also include other workflows, such as default or example workflows generated by the manufacturer of device 120, or workflows copied from another device (e.g., copied under the control of generator 126 or alternatively another component).

Print control module 130 manages the printing of data by device 120 in a conventional manner in order to generate a hard copy. Print requests can be received locally (e.g., a request to scan a document and print a copy of the document) or alternatively remotely (e.g., a remote computing device sending a document in digital form and requesting that a hardcopy of the document be generated).

Scan control module 132 manages the scanning of an input document by device 120 in a conventional manner in order to generate a digital or electronic version of the input document. The digital or electronic version can be used in a variety of different manners, such as for storage, electronic mailing, etc.

Request processing module 134 manages the processing of requests received by printing device 120, whether they be received locally or from a remote device. When a request is received, the request identifies a particular workflow from storage area 128 to be used in processing the request. The workflow identification may be explicit (e.g., a request received from a remote device may identify a workflow by name or other unique ID, or a user entering a request locally may select a particular button or icon on a display device that identifies the desired workflow). In certain situations, the workflow identification may also be implicit (e.g., a particular workflow may be inherently associated with a particular source device network address, source device name, source email address, target email address, etc.).

Image processing module 136 manages the conventional processing of digital images or streams of audio and/or video data. Digital images or streams can be processed in a variety of different manners, such as to crop images, compress images, sharpen images, etc.

Email module 138 manages the receipt and sending of email. Requests can be input to module 138 by sending of an email message including the data to be processed to device 120. Processing of a request may also entail sending an email message include at least a portion of the data (or an indication that the data was processed by device 120) to a particular email address. Any of a variety of conventional email protocols may be used by email module 138, such as SMTP (Simple Mail Transfer Protocol), etc.

Printing device 120 thus allows a user to generate workflows for device 120 either locally or remotely. These workflows can then be used by device 120 in processing requests received from the user and/or other users. By defining the operations to be performed for a request using the workflows that are stored at printing device 120, a computing device need only communicate a request identifying data and a workflow to the printing device. Thus, a printer-specific driver is not needed on the computing device.

Figure 3:
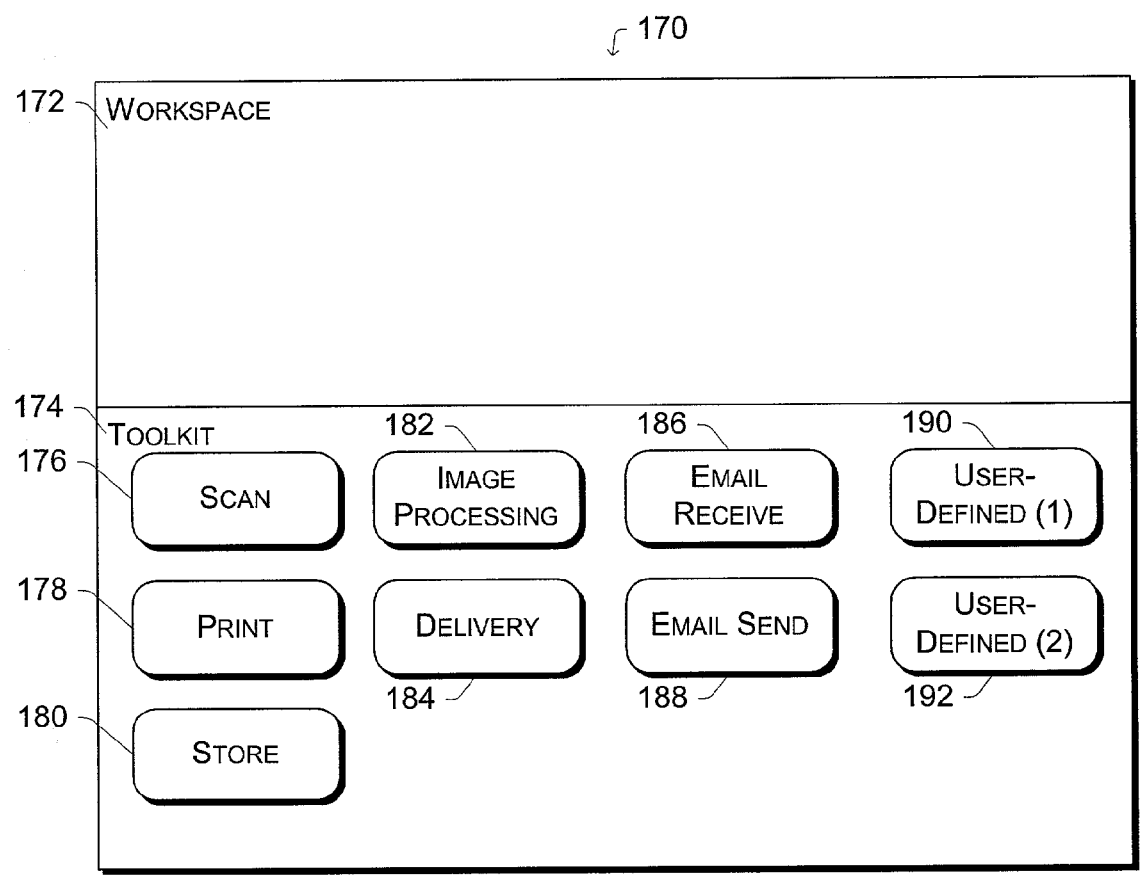
FIG. 3 illustrates an exemplary graphical user interface (GUI) display which can be used to generate a workflow for a printing device.

FIG. 3 illustrates an exemplary graphical user interface (GUI) display 170 which can be used to generate a workflow for a printing device. Display 170 can be displayed locally at the printing device (e.g., a device 104 of FIG. 1) or alternatively at a remote computing device (e.g., a device 102 of FIG. 1), such as within a web browser on the remote device using HTML (HyperText Markup Language) over HTTP.

Display 170 includes two portions: a workspace portion 172 and a toolkit portion 174. Toolkit portion 174 includes multiple icons that correspond to different operations that can be performed by the printing device. In FIG. 3, toolkit portion 174 is illustrated as including icons that look like buttons with alphanumeric labels. Alternatively, different characters may be used as the labels, or graphical icons without labels may be used (e.g., a graphical representation of a printer rather than a button with the label "print"). Toolkit portion 174 may be any type of character-based or graphical-based display, so long as the different options can be identified to the user.

The icons illustrated in toolkit 174 include a scan icon 176, a print icon 178, a store icon 180, an image processing icon 182, a delivery icon 184, an email receive icon 186, an email send icon 188, and two user-defined icons 190 and 192. Scan icon 176 represents the scanning operation of the printing device, print icon 178 represents the printing operation of the printing device, and store icon 180 represents the ability of the printing device to store data locally at the printing device or at some remote location.

Image processing icon 182 represents the ability of the printing device to process digital images, and delivery icon 184 represents the ability of the printing device to communicate data to other printing devices for printing on the other devices (optionally converting the data to a particular format, such as Postscript or PCL, prior to sending the data). Email receive icon 186 represents the ability of the printing device to receive email messages, while email send icon 188 represents the ability of the printing device to send email messages. The user defined icons 190 and 192 represent previous user-defined workflows that are available on the printing device.

The options illustrated in toolkit portion 174 of FIG. 3 are exemplary only. Different printing devices may support additional options not shown in FIG. 3, or may not support some of the options illustrated in FIG. 3.

In order to generate a new workflow, the user places one or more of the icons from toolkit portion 174 into workspace portion 172. Multiple different icons from toolkit portion 174 may be placed into workspace portion 172, and each icon may be placed into workspace portion 172 multiple times. In generating a new workflow, the user is able to place previously defined workflows (as represented by icons 190 and 192) into workspace portion 172, thereby allowing a hierarchical workflow model.

Icons can be placed from toolkit portion 174 into workspace portion 172 in a variety of different manners. In one implementation, the user is able to "drag and drop" an icon from portion 174 to portion 172. For example, when using a touchscreen, the user may place his or her finger on scan icon 176 and drag it across display 170 into workspace 172. Alternatively, the user may press an "add" icon (not shown) and then press a particular icon 176-192 in order to place the icon into portion 172, or use any of a wide variety of other selection mechanisms.

Typically, when placing an icon from toolkit portion 174 into workspace portion 172, copies of the icon are in portion 172 as well as portion 174. Alternatively, the original icon from toolkit portion 174 may no longer be displayed in portion 174. If the user desired to use the icon multiple times, it could be placed in portion 172 again by the user selecting to copy or duplicate the icon already in portion 172.

The location in workspace portion 172 for a particular icon is chosen by the user based on where the user indicates to place the icon in portion 172. This may cause the workflow generator to reposition previously placed icons in portion 172 so that icons can be clearly seen and do not overlap. Alternatively, the icons may be placed in workspace portion 172 automatically by the workflow generator, such as by arranging the icons in the order they are chosen by the user.

In addition to choosing icons for placement in workspace portion 172, the user is able to connect the icons together, using directional arrows, in whatever order the user desires in order to identify a sequence of operations. The drawing of arrows can be performed in a variety of manners, such as choosing an arrow icon (not shown) and placing the arrow icon so that it touches the appropriate icons, selecting beginning and ending icons and then selecting an "add arrow" icon (not shown), pressing (e.g., via a touchscreen) the beginning icon and then pressing the ending icon (while still pressing the beginning icon) to cause the arrow to be added, and so forth.

Each icon in workspace portion 172 can be the beginning icon for multiple arrows, as well as the ending icon for multiple arrows. Thus, workflow operations can be performed (partially or wholly) parallel, and need not be limited to sequentially ordered operations. For example, a scan icon may be selected as the first icon in a workflow, and then one arrow added from the scan icon to an email send icon and another arrow added from the scan icon to a print icon. When a request is subsequently processed using the workflow, the scanned document is concurrently sent to a particular email address and a hard copy of the document printed.

The workflows generated can be hierarchical in nature, allowing one workflow to incorporate previously generated workflows. The workflow generator allows a previously generated workflow (e.g., one of the user-defined workflows 190 or 192) to be added to a workflow currently being generated. Furthermore, the workflow generator allows the previously generated workflow icon to be selected and expanded or "zoomed" in on, displaying the icons in the previously generated workflow in workspace portion 172. Additionally, this previously generated workflow may in turn include one or more additional previously generated workflows which can be selected and zoomed in on, and so forth.

The workflow generator may also allow the user to modify previously generated workflows. For example, the user may be able to modify one of the user-defined workflows 190 or 192. The user can select a workflow for modification (e.g., by pressing a "modify" button (not shown) and the workflow to be modified), which causes the workflow generator to display the sequence of operations for the workflow in workspace portion 172. The user can then add/remove operations, change connections, change properties (as discussed in more detail below), and save the modified workflow. The modified workflow can replace the previous version of the workflow, or alternatively may be a new workflow with a new name.

Figure 4:
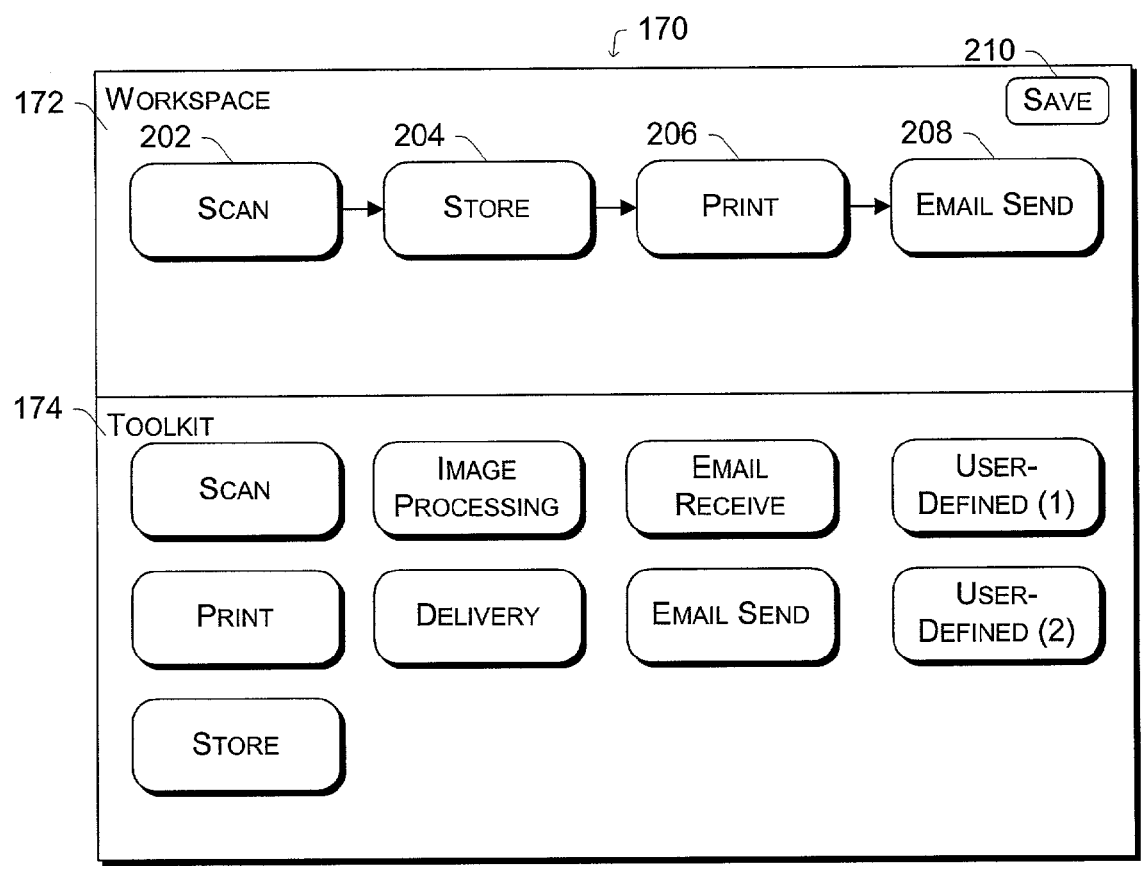
FIG. 4 illustrates the exemplary display of FIG. 3 after some of the icons from the toolkit portion have been chosen by the user to generate a workflow.

FIG. 4 illustrates exemplary display 170 after some of the icons from toolkit portion 174 from FIG. 3 have been chosen by the user to generate a workflow. Icons 202, 204, 206, and 208 have been placed in workspace portion 172, and arrows added as shown. Thus, the user has identified, in workspace portion 172, a workflow that initially scans an input document (scan icon 202), stores the scanned document (store icon 204), prints one or more hard copies of the scanned document (print icon 206), and sends an email message(s) including the scanned document (email send icon 208).

Workspace portion 172 also includes a save button 210, selection of which causes the workflow generator to save the workflow identified in workspace portion 172. Thus, the user is able to generate workflows to be used in processing future requests by identifying the sequence of operations in workspace portion 172 and saving the sequence. The workflow generator may prompt the user for a name of the workflow, or alternatively automatically assign a name to the workflow.

Figure 5:
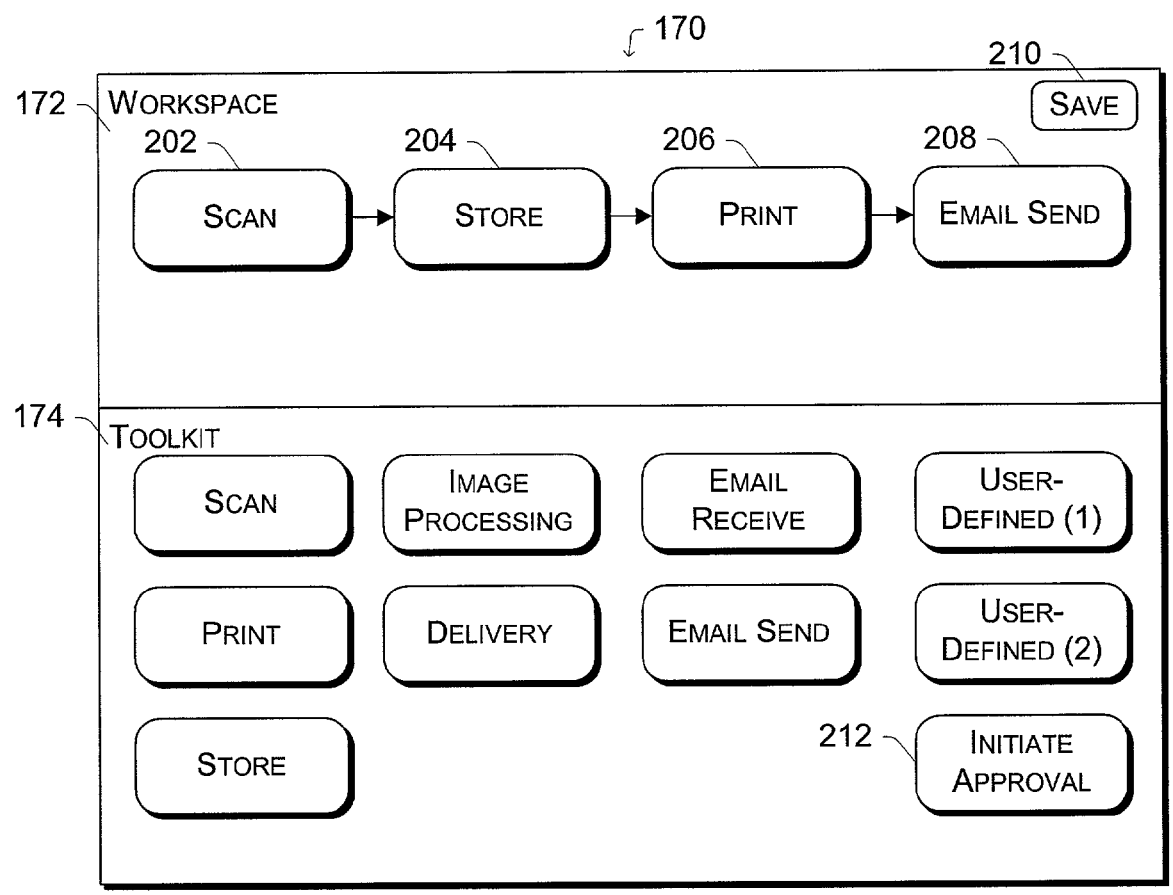
FIG. 5 illustrates the exemplary display of FIG. 3 after the sequence of operations from FIG. 4 has been saved.

FIG. 5 illustrates exemplary display 170 after the sequence of operations from FIG. 4 has been saved. In the illustrated example, the user provided a name for the workflow of "Initiate Approval". In response to the save request and user-provided name, the workflow generator saves the sequence of operations in portion 172 in the workflow storage area and generates a new icon 212 with the label "Initiate Approval".

Returning to FIG. 3, the operations that can be part of a workflow include one or more user-definable properties or parameters. Some operations may not have any such user-definable properties, but most typically will. For user-defined workflows, the properties for operations in those workflows are configured by selecting the operations in those workflows. The user is able to define or configure these properties by selecting the icon representing the operation in workspace portion 172 (or alternatively in toolkit portion 174). The specific properties will vary based on the type of operation. Table I includes an exemplary list of user-definable properties for the operations represented in toolkit portion 174. The list in Table I is exemplary only—not all properties listed may be available, or additional properties may be included.

TABLE I

| Operations | User-Definable Properties |
|---|---|
| Scan | Resolution; color or black & white; whether to use optical character recognition (OCR); file type to be created (e.g., TIFF, JPEG, bitmap). |
| Print | Print quality; number of copies; whether to scale to a particular size of paper; a paper size and/or source. |
| Store | The device where the file and/or directory is to be stored; the filename to store the document under; a file format to use in storing the document. |
| Image Processing | How much to sharpen or soften an image; how to crop an image; how much to compress an image; an image compression algorithm to use in compressing the image; whether to perform red-eye reduction; what special effects to add. |
| Delivery | The printing device that is to receive the file for printing; a print quality the device should use; a number of copies the device should print; whether the device should scale to a particular size of paper; a paper size and/or source the device should use. |
| Email Receive | A particular recipient email address(es) for received email messages; a particular source email address(es) for received email messages. |
| Email Send | Email address(es) to which email messages are to be sent; a source email address for email messages that are sent; whether to attach a document to email messages. |

Figure 6:
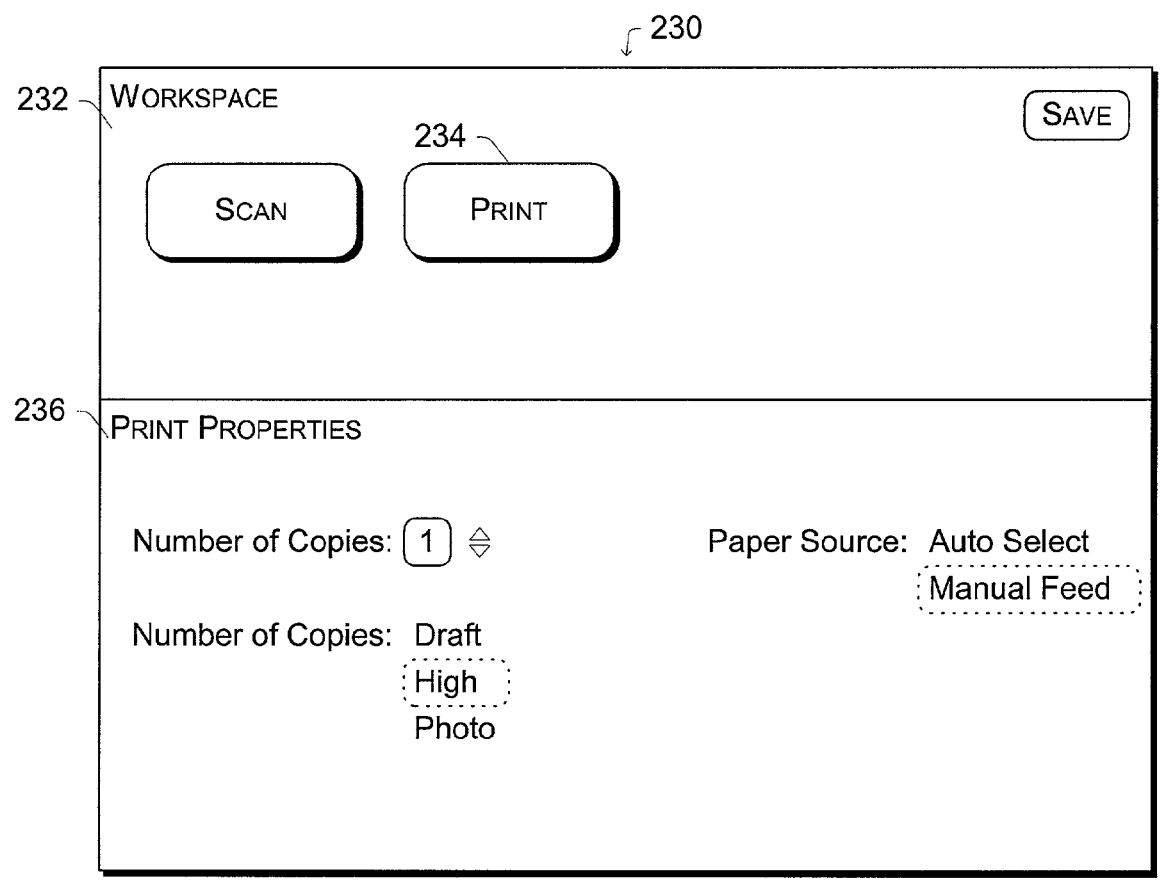
FIG. 6 illustrates an exemplary display with multiple properties for a particular operation.

FIG. 6 illustrates an exemplary display with multiple properties for a particular operation. The display 230 of FIG. 6 assumes that the user is generating (or modifying) a workflow in workspace portion 232 that includes a print icon 234. Selection of print icon 234 (e.g., double-clicking or quickly pressing print icon 234 twice) causes toolkit portion 174 of display 170 (FIG. 3) to be replaced with an operation-specific portion 236 (a print-specific portion in the illustrated example).

Operation-specific portion 236 allows the user to configure the various properties for the operation. In the illustrated example of FIG. 6, the user is able to identify a number of copies to be printed, a print quality, as well as a paper source. Any of a variety of input mechanisms can be used, such as using up and down arrows to increment and decrement a number, a cursor control device to move a cursor, direct entry from an alphanumeric keypad, etc.

Returning to FIG. 3, a wide variety of workflows can be generated by a user to suit his or her particular needs. For example, the workflow illustrated in workspace portion 172 of FIG. 5, with appropriate operation properties set, when requested by the user may cause the printing device to scan one or more input pages, save the scanned pages to the "documents for approval" folder or directory of a mass storage device (of the printing device or alternatively some remote device), print four copies of the scanned pages, and email the scanned pages to the address "myname@myhost.com".

By way of another example, a workflow may include operations that, when an email message is received that is sent to a particular email address (e.g., "myphotos@printer.com"), cause the printing device to convert the attached digital images or documents to JPEG files, email the JPEG files to another email address (e.g., "myphotostorage@myhost.com"), compress the images even further, and email the more compressed images to a web server for posting.

Figure 7:
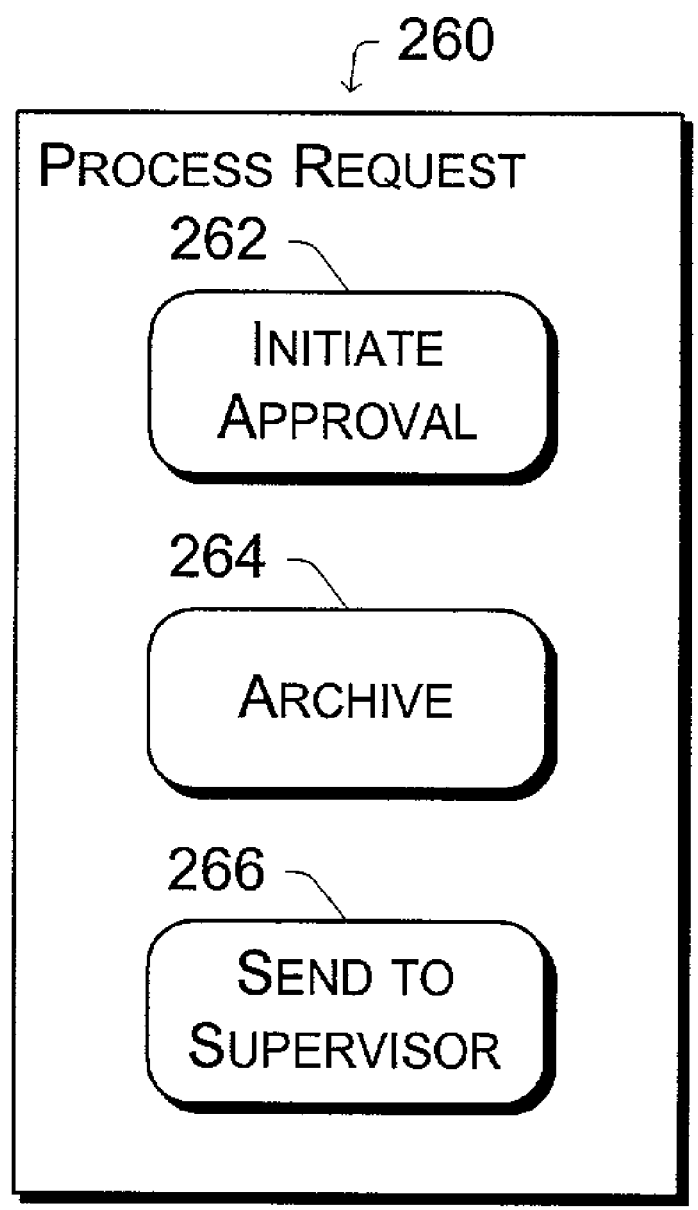
FIG. 7 illustrates an exemplary display that can be used to select a workflow for processing a request.

FIG. 7 illustrates an exemplary display 260 that can be used to select a workflow for processing a request. Display 260 includes three previously defined workflows represented by an Initiate Approval icon 262, an Archive icon 264, and a Send to Supervisor icon 266. When submitting a request, the user can select one of these three workflows and have the appropriate operations (as defined by the workflow) performed on the input data.

Figure 8:
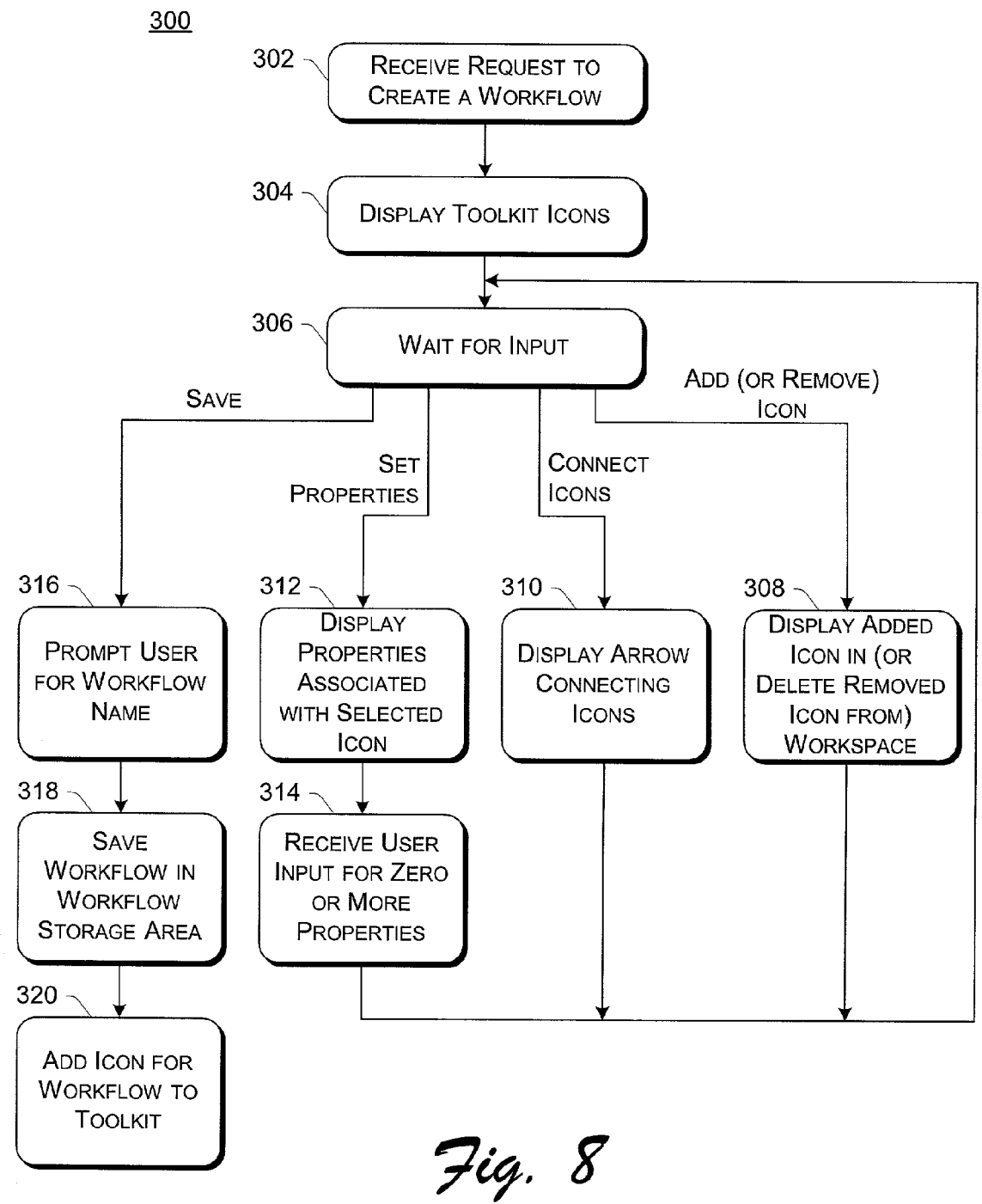
FIG. 8 is a flowchart illustrating an exemplary process for generating a workflow.

FIG. 8 is a flowchart illustrating an exemplary process 300 for generating a workflow. The process of FIG. 8 is performed by a workflow generator, such as generator 126 of FIG. 2, and may be performed in software.

Initially, a request to create a workflow is received (act 302), in response to which the toolkit icons are displayed (act 304). The workflow generator then waits for an input (act 306). The response to the input varies based on the type of input. In the illustrated example, the user can select to add an icon to the workflow, connect icons in the workflow, set properties for an icon of the workflow, or save the workflow. If the user selects to add an icon to (or remove an icon from) the workflow, then the selected icon is added to and displayed as part of (or removed from) the workflow (act 308), and workflow generator proceeds to wait for another input (act 306). If the user selects to connect icons in the workflow, then an arrow connecting the selected icons is displayed (act 310), and workflow generator proceeds to wait for another input (act 306). If the user selects to set properties of an icon, then the properties associated with the selected icon are displayed (act 312). User input is received for zero or more of the properties (act 314), and workflow generator proceeds to wait for another input (act 306). If the user selects to save the workflow, then the user is prompted for a workflow name (act 316). The workflow is saved in the workflow storage area under the user-provided name (act 318), and an icon for the workflow is added to the toolkit (act 320).

Figure 9:
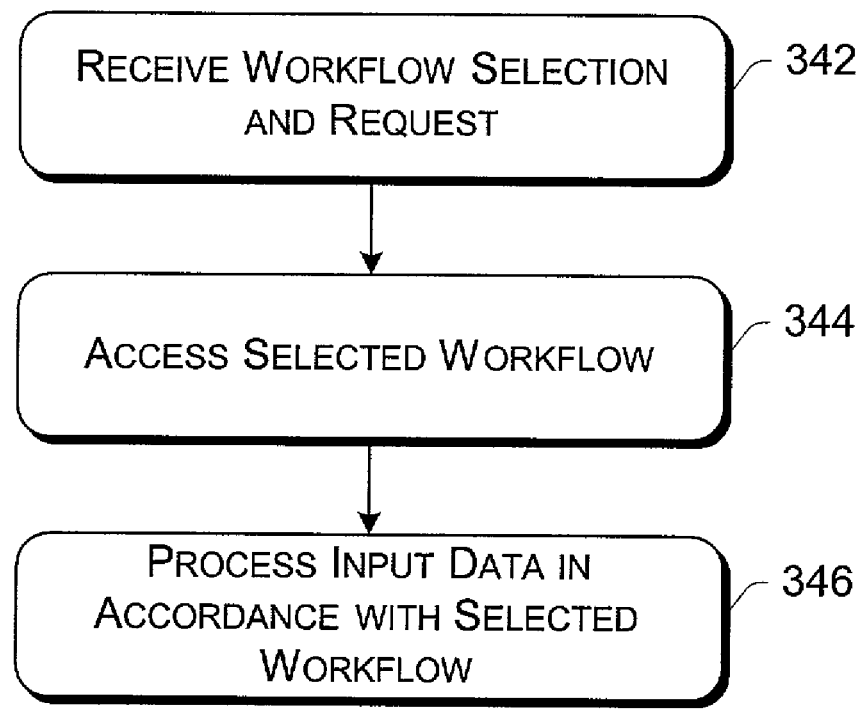
FIG. 9 is a flowchart illustrating an exemplary process for processing a request using a workflow.

FIG. 9 is a flowchart illustrating an exemplary process 340 for processing a request using a workflow. The process of FIG. 9 is performed by various modules of a printing device. Which specific modules are used depends on the operations identified in the particular workflow.

Initially, a workflow selection and request is received (act 342). The request may be received locally (e.g., from an input panel of the printing device), or from any of a variety of devices capable of communicating control information and/or data (e.g., computing devices, digital cameras or camcorders, etc.). The workflow selection may be explicit (e.g., by name or some other indicator) or implicit (e.g., inherent in the email address the request is sent to). The selected workflow is accessed from the workflow storage area (act 344), and the input data associated with the request is processed in accordance with the selected workflow (act 346). The input data may be included with the request, or alternatively identified by the request (e.g., the request may include a pointer to the input data, such as a URL).

Figure 10:
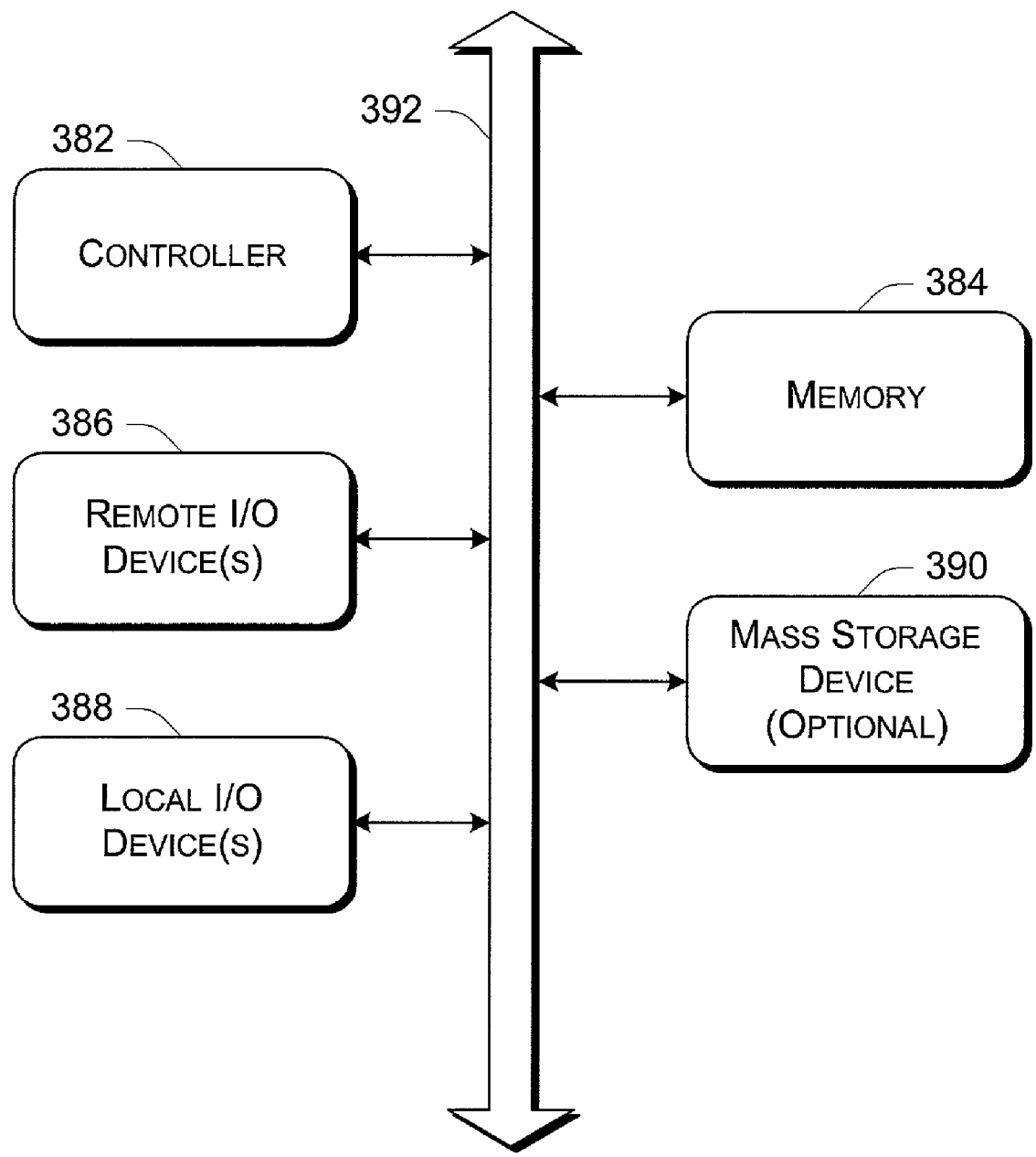
FIG. 10 illustrates portions of an exemplary device in additional detail.

FIG. 10 illustrates portions of an exemplary device 380 in additional detail. Device 380 can be, for example, a computing device 102 or printing device 104 of FIG. 1. Device 380 includes a processor or controller 382, a memory 384, a remote I/O device(s) 386, a local I/O device(s) 388, and an optional mass storage device 390, all coupled to a bus 392. Depending on the type of the device, various additional conventional components may also be typically included in device 380 (e.g., a printing device will typically include a print engine, print media inputs and outputs, etc.).

Controller or processor 382 can be a general purpose microprocessor or a dedicated microcontroller (e.g., one or more Application Specific Integrated Circuits (ASICs) or programmable logic devices (PLDs)). Remote I/O device(s) 386 is one or more conventional interface devices allowing components of device 380 (e.g., controller 382) to communicate with other devices external to device 380. Remote I/O device(s) 386 may include, for example, a modem, a network interface card (NIC), a parallel port, a serial port, a universal serial bus (USB) port, and so forth. Local I/O device(s) 388 is an interface device allowing local commands and/or data to be input to and/or output from device 380. Local I/O interface 388 may include, for example, a display device (e.g., liquid crystal display (LCD), light emitting diode (LED), etc.), a keypad (e.g., alphanumeric or otherwise), a touchscreen, a cursor control device (e.g., a trackpad, trackball, etc.), document scanning devices, print media handlers and printing components (e.g., ink or toner dispensers), and so forth.

Bus 392 represents one or more buses in printing device 380, which may be implemented in accordance with public and/or proprietary protocols. The bus architecture can vary by printing device as well as by manufacturer. Mass storage device 390 is optional and represents any of a wide variety of conventional storage devices, such as fixed or removable magnetic or optical disks, Flash memory, etc.

Memory 384 represents volatile and/or nonvolatile memory used to store instructions and data for use by controller or processor 382. Typically, instructions are stored on a mass storage device 390 (or nonvolatile memory portion of memory 384) and loaded into a volatile memory portion of memory 384 for execution by controller or processor 382. Additional memory components may also be involved, such as cache memories internal or external to controller or processor 382. Various embodiments of the invention may be implemented, at different times, in any of a variety of computer readable media that is part of, or readable by, device 380. For example, such computer readable media may be mass storage device 390, memory 384, a cache memory, media (e.g., a magnetic or optical disk) accessible to device 380, and so forth.

Device 380 is exemplary only. It is to be appreciated that additional components (not shown) can be included in device 380 and some components illustrated in device 380 need not be included. For example, additional processors or storage devices, additional I/O interfaces, and so forth may be included in device 380, or mass storage device 390 may not be included.

Various discussions herein refer to software components and modules that can be implemented in a printing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A graphical user interface comprising:
   a toolkit portion including a plurality of icons that can be selected by a user, wherein each of the plurality of icons represents an operation that can be performed by a printing device;
   a workspace portion into which the user can have placed one or more of the plurality of icons and in which the user can arrange the one or more of the plurality of icons in an order to identify a sequence of one or more operations of the printing device and generate a workflow for the printing device, wherein the printing device performs the one or more operations in the order of the identified sequence when the generated workflow is selected;
   a properties portion where one or more properties of an operation in the workflow can be set, wherein the properties portion displays properties associated with a respective icon and replaces the toolkit portion with the properties when the respective icon is selected; and
   a save button via which the user can select to save the generated workflow, wherein an icon for the generated workflow is added to the toolkit portion when the generated workflow is saved.

2. A graphical user interface as recited in claim 1, wherein the workspace portion further includes one or more arrows that each connect two icons of the plurality of icons to identify the sequence.

3. A graphical user interface as recited in claim 1, wherein one of the plurality of icons in the toolkit portion corresponds to a previously generated workflow.

4. A graphical user interface as recited in claim 1, wherein the plurality of icons comprise a scan icon, a print icon, a store icon, an image processing icon, a delivery icon, an email receive icon, and an email send icon.

5. One or more computer readable media having stored thereon a plurality of instructions that, when executed by one or more processors of a computing device, causes the one or more processors to perform acts comprising:
   accessing a remote printing device without a driver specific to the remote printing device being installed on the computing device;
   receiving, from the remote printing device, an indication of a plurality of operations that the printing device can perform;
   displaying representations of one or more of the plurality of operations;
   allowing a user of the computing device to arrange one or more of a plurality of icons each representing one of the operations of the remote printing device in an order to identify a sequence of one or more operations from the displayed operations and generate a workflow for the remote printing device, wherein the remote printing device performs the one or more operations in the order of the identified sequence when the generated workflow is selected;

saving the identified sequence and adding an icon representing the identified sequence to the plurality of icons; and returning the identified sequence to the remote printing device for use in processing requests subsequently received by the remote printing device, wherein the plurality of icons comprise a scan icon, a print icon, a store icon, an image processing icon, a delivery icon, an email receive icon, and an email send icon.

6. One or more computer readable media as recited in claim 5, wherein accessing the remote printing device comprises communicating with the remote printing device using HTTP (HyperText Transfer Protocol).

7. One or more computer readable media as recited in claim 5, wherein displaying representations of one or more of the plurality of operations and allowing the user to identify a sequence of operations comprises:

displaying a graphical user interface having both a workspace portion and a toolkit portion that includes an icon for each of the one or more of the plurality of operations; and allowing the user to select ones of the icons and copy them from the toolkit portion to the workspace portion, and to connect selected pairs of the icons in the workspace portion to identify the sequence.

8. One or more computer readable media as recited in claim 7, wherein displaying representations of one or more of the plurality of operations and allowing the user to identify a sequence of operations further comprises:

replacing the toolkit portion of the graphical user interface with a properties portion and displaying properties associated with an operation of a respective icon in the properties portion when the respective icon is selected.

9. One or more computer readable media as recited in claim 5, wherein the plurality of instructions further cause the one or more processors to perform acts comprising:

receiving a user selection of an operation in the sequence;

displaying one or more properties corresponding to the operation;

receiving user input for at least one of the one or more properties; and saving the user input for the operation in the sequence.

10. One or more computer readable media as recited in claim 5, wherein the plurality of operations include one or more previously identified sequences of operations.

11. A method implemented in a printing device, the method comprising:

receiving a request to create a workflow for the printing device;

displaying representations of one or more operations that may be included in the workflow, the one or more operations comprising a scan operation, a print operation, a store operation, an image processing operation, a delivery operation, and an email operation;

receiving a user selection of at least one of the one or more operations;

adding the user-selected operations to the workflow;

allowing user arrangement of the user-selected operations in an order to identify a sequence in which multiple ones of the user-selected operations are to be performed to create the workflow for the printing device;

receiving an indication that creation of the workflow is completed;

saving the workflow and adding a representation of the saved workflow to the displaying of the one or more operations;

subsequently receiving a request that identifies the workflow; and performing on data associated with the request, the ones or more operations in the workflow in the order of the user-identified sequence.

12. A method as recited in claim 11, wherein displaying the one or more operations comprises displaying one or more icons corresponding to the one or more operations.

13. A method as recited in claim 11, further comprising:

receiving a user request to set properties for one of the operations in the workflow;

receiving user settings for the properties; and saving the user settings with the operation in the workflow.

14. A method implemented in claim 11, further comprising:

receiving a request to process data;

accessing a stored set of one or more sequences of operations;

determining, based at least in part on the request, which sequence from the stored set to use in processing the data; and processing the data by performing the operations in the sequence in an order identified by the sequence.

15. A method as recited in claim 14, wherein determining which sequence from the stored set to use in processing the data comprises identifying a sequence indicator included as part of the request.

16. A printing device comprising:

a controller; and a memory, coupled to the controller, configured to store a plurality of instructions to be executed by the controller, that cause the controller to, receive a request to create a workflow for the printing device, display one or more operations that may be included in the workflow, receive a user selection of at least one of the one or more operations, add the user-selected operations to the workflow, allow user arrangement of the user-selected operations in an order to identify a sequence in which multiple ones of the user-selected operations are to be performed to create the workflow for the printing device, receive an indication that creation of the workflow is completed, save the workflow, add the saved workflow to the display of the one or more operation, subsequently receive a request that identifies the workflow; and perform, on data associated with the request, the one or more operations in the workflow in the order of the user-identified sequence, wherein the one or more operations comprise a scan operation, a print operation, a store operation, an image processing operation, a display operation, and an email operation.

17. A printing device as recited an claim 16, wherein the instructions to display the one or more operations comprise instructions to display one or more icons corresponding to the one or more operations.

18. A printing device as recited in claim 16, wherein the plurality of instruction further cause the controller to:
receive a user request to set properties for one of the operations in the workflow;
receive user settings for the properties; and
save the user settings with the operation in the workflow.

19. A method implemented in a printing device, the method comprising:
receiving a request to create a workflow for the printing device;
displaying a representations of one or more operations that may be included in the workflow, the one or more operations comprising a scan operation, a print operation, a store operation, an image processing operation, a delivery operation, and an email operation;
receiving a user selection of at least one of the one or more operations;
adding the user-selected operations to the workflow;
allowing user arrangement of the user-selected operations and receiving a user selection of a sequence in which multiple ones of the user-selected operations are to be performed to create the workflow for the printing device;
receiving an indication that creation of the workflow is completed; and
saving the workflow and adding a representation of the saved workflow to the displaying of the one or more operations, and further comprising:
receiving a request to process data;
accessing a stored set of one or more sequences of operations;
determining, based at least in part on the request, which sequence from the stored set to use in processing the data; and
processing the data by performing the operation in the sequence in an order identified by the sequence, wherein:
receiving the request to process data comprises receiving the request as an electronic mail message; and
determining which sequence from the stored set to use in processing the data comprises checking, based on an electronic mail address to which the electronic mail message was sent, which sequence is to be used.

20. A method as recited in claim 19, further comprising:
subsequently receiving a request that identifies the workflow; and
performing, an data associated with the request, the one or more operations in the workflow in the user-selected order.

21. A method as recited in claim 19, wherein displaying the one or more operations comprises displaying one or more icons corresponding to the one or more operations.

22. A method as recited in claim 19, further comprising:
receiving a user request to set properties for one of the operations in the workflow;
receiving user settings for the properties; and
saving the user settings with the operation in the workflow.

23. A method as recited in claim 19, wherein determining which sequence from the stored set to use in processing the data comprises identifying a sequence indicator included as part of the request.

* * * * *

UNITED STATES PATENT AND TRADEMARK OFFICE
CERTIFICATE OF CORRECTION

PATENT NO. : 7,408,658 B2
APPLICATION NO. : 10/000527
DATED : August 5, 2008
INVENTOR(S) : Roger S. Twede It is certified that error appears in the above-identified patent and that said Letters Patent is hereby corrected as shown below:

In column 10, line 62, in Claim 5, after "that the" insert -- remote --.

In column 11, line 26, in Claim 7, delete "an icon" and insert -- the icons --, therefor.

In column 12, line 10, in Claim 11, after "performing" insert -- , --.

In column 12, line 10, in Claim 11, delete "ones" and insert -- one --, therefor.

In column 12, line 22, in Claim 14, delete "implemented" and insert -- as recited --, therefor.

In column 12, line 57, in Claim 16, delete "operation" and insert -- operations --, therefor.

In column 12, line 66, in Claim 16, delete "display" and insert -- delivery --, therefor.

In column 13, line 1, in Claim 17, delete "an" and insert -- in --, therefor.

In column 13, line 7, in Claim 18, delete "instruction" and insert -- instructions --, therefor.

In column 13, line 17, in Claim 19, after "displaying" delete "a".

In column 14, line 7, in Claim 19, delete "operation" and insert -- operations --, therefor.

UNITED STATES PATENT AND TRADEMARK OFFICE
CERTIFICATE OF CORRECTION

PATENT NO.         : 7,408,658 B2
APPLICATION NO. : 10/000527
DATED                : August 5, 2008
INVENTOR(S)      : Roger S. Twede It is certified that error appears in the above-identified patent and that said Letters Patent is hereby corrected as shown below:

In column 14, line 20, in Claim 20, detete "an" and insert -- on --, therefor.

Signed and Sealed this

Eighteenth Day of August, 2009

David J. Kappos
*Director of the United States Patent and Trademark Office*